United States Patent [19]

Shapiro

[11] Patent Number: 5,399,024
[45] Date of Patent: Mar. 21, 1995

[54] FACE SEAL WITH HYDRODYNAMIC THRUST PADS

[75] Inventor: Wilbur Shapiro, Schenectady, N.Y.

[73] Assignee: Dresser-Rand Company, Olean, N.Y.

[21] Appl. No.: 180,637

[22] Filed: Jan. 12, 1994

[51] Int. Cl.⁶ ........................ F16C 32/06; F16J 15/38
[52] U.S. Cl. ........................ 384/124; 277/96.1
[58] Field of Search ............... 277/96, 96.1, 96.2; 384/117, 122, 124, 306, 312, 138

[56] References Cited

U.S. PATENT DOCUMENTS

| | | |
|---|---|---|
| 2,137,487 | 11/1938 | Hall . |
| 3,930,691 | 1/1976 | Greene . |
| 4,362,304 | 12/1982 | Hünger ........................ 277/27 |
| 4,403,873 | 9/1983 | Gardner ........................ 384/306 |
| 4,496,251 | 1/1985 | Ide ........................ 384/117 |
| 4,515,486 | 5/1985 | Ide ........................ 384/118 X |
| 4,544,285 | 10/1985 | Shapiro et al. ........................ 384/99 |
| 4,639,146 | 1/1987 | Yoshioka et al. ........................ 384/99 |
| 4,738,453 | 4/1988 | Ide ........................ 277/96.1 X |
| 4,738,550 | 4/1988 | Gardner ........................ 384/306 |
| 4,919,549 | 4/1990 | Lawson et al. ........................ 384/113 |
| 4,927,275 | 5/1990 | Lawson ........................ 384/117 |
| 5,246,295 | 9/1993 | Ide ........................ 384/124 |

Primary Examiner—Thomas R. Hannon
Attorney, Agent, or Firm—Richards, Medlock & Andrews

[57] ABSTRACT

A face seal with hydrodynamic thrust pads assembly is provided. The assembly comprises a ring structure with a front side facing in an axial direction that has a seal face continuous about the ring structure and a plurality of cut-outs with concave surfaces spaced concentrically around the seal face. A plurality of elastomeric laminates having a convex side are disposed in the concave surfaces. A plurality of thrust pads are bonded to the laminates such that one side of the thrust pads are all in a plane parallel to the plane of the seal face. When a closing load is transmitted against an opposing member by the sealing pressure against the back face of the assembly while the opposing member rotates relative to the assembly, friction and pressure forces cause the thrust pads to swing about a pivot point located towards the opposing member such that the fluid film converges in the direction of movement of the opposing member. Simultaneously, the seal face seals against the opposing member.

4 Claims, 2 Drawing Sheets

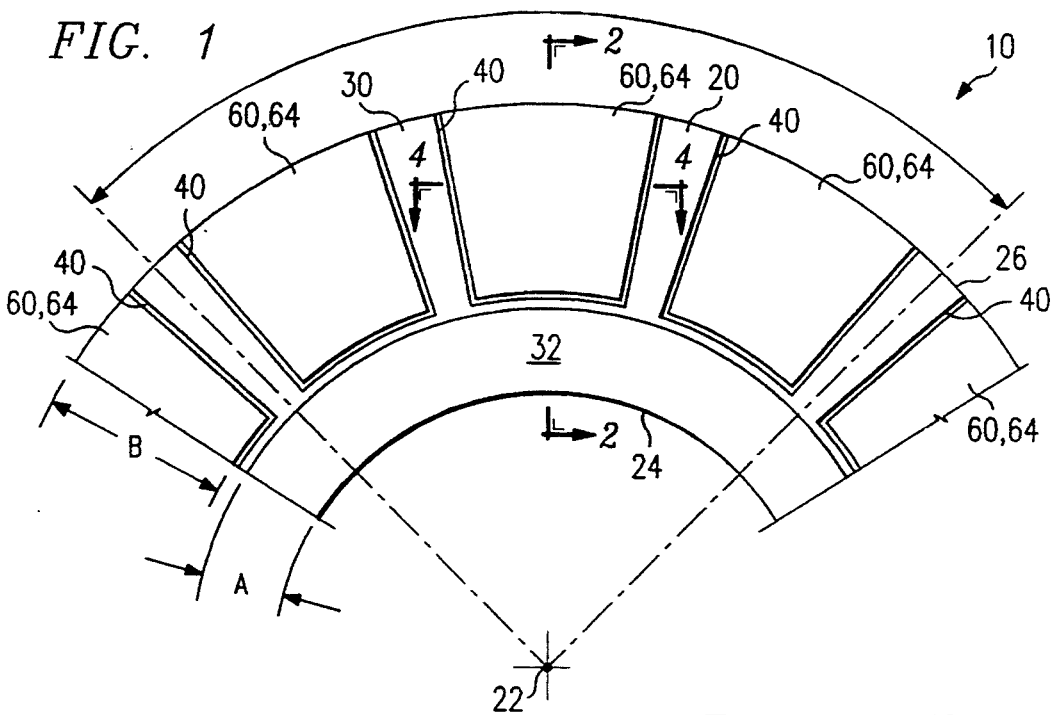
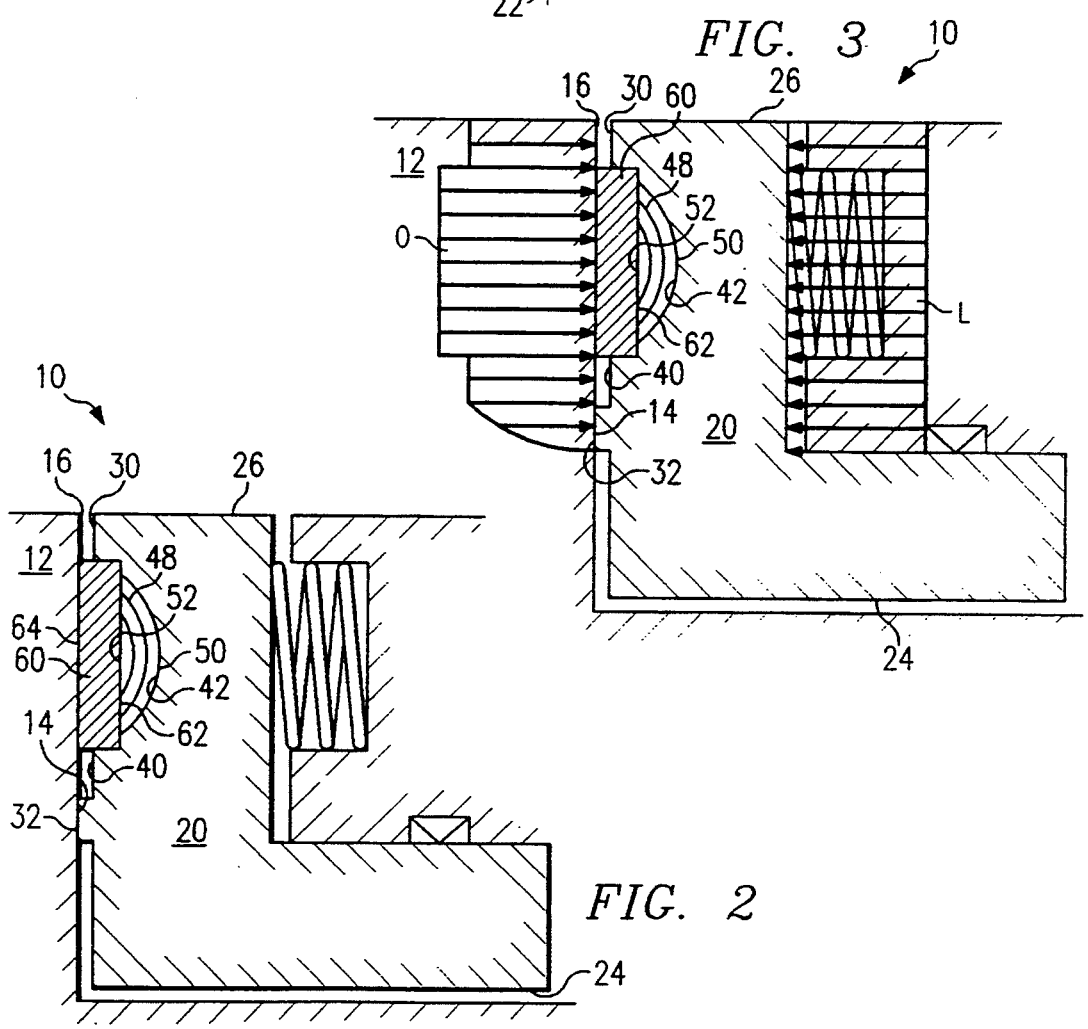

FACE SEAL WITH HYDRODYNAMIC THRUST PADS

TECHNICAL FIELD OF THE INVENTION

The present invention relates to a mechanical face seal having a continuous face seal region surrounded by a plurality of hydrodynamic thrust pads.

BACKGROUND OF THE INVENTION

The need exists for a low leakage, bidirectional seal that includes a positive stiffness, fluid film interface to counteract hydraulic and spring closing loads. In addition, the seal should have zero speed shut off capability and low friction start-stop characteristics.

SUMMARY OF THE INVENTION

The present invention provides a contact face seal with surrounding hydrodynamic thrust pads for counteracting closing forces on the seal.

The assembly comprises a seal ring structure having a center axis, an inner periphery facing generally radially inwardly, an outer periphery facing generally radially outwardly, and a front side facing in an axial direction. The front side has a radial extent from the inner periphery to the outer periphery and part of its radial extent is a seal face in a plane perpendicular to the center axis of the ring structure. The seal face is continuous about the ring structure and suitable for sealing against the sealing surface of the opposing member when the opposing member rotates relative to the ring structure and the seal face. The front side also has as part of its radial extent a plurality of cut-outs in a circular pattern concentric with the seal face. Each cut-out defines a concave surface.

The assembly also comprises a plurality of elastomeric laminates. Each laminate has a convex side and a pad side opposite thereto., The convex side of each laminate is curved substantially the same as the concave surfaces of the cut-outs and disposed against the concave surface of one of the cut-outs.

Next, the assembly comprises a plurality of hydrodynamic thrust pads, each thrust pad having a back and a front opposite thereto. The back of each thrust pad is bonded to the pad side of one of the laminates. The curvature of the laminate in the cut-out is such that when a closing load is transmitted by the high pressure on the rear side of the seal ring against the thrust pads while the opposing member rotates relative to the ring, friction and pressure forces of the fluid film cause each pad to swing about a pivot point located towards the opposing member such that the fluid film converges in the direction of movement of the opposing member. This action causes rapid hydrodynamic lift off of the thrust pads and supports the closing load with a frictionless film. The contact face seal portions of the assembly is relieved of high interface loading by the thrust pads and can seal against high pressure differentials without distress.

The seal ring includes a rear face and a ring of smaller diameter connected thereto and a secondary seal between the smaller diameter ring and a stationary housing. The outer diameter of the smaller ring governs the rear face area exposed to high pressure, and thus, the hydraulic closing load of the seal.

BRIEF DESCRIPTION OF THE DRAWINGS

FIG. 1 is a partial front view of the hydrodynamic face seal with hydrodynamic thrust pads of the present invention.

FIG. 2 is a cross-section of the assembly of the present invention taken along line 2—2 of FIG. 1 and a cross-section of an opposing member.

FIG. 3 is the cross-section of FIG. 2 illustrating the distribution oft the closing load and counteracting load.

DETAILED DESCRIPTION OF THE PREFERRED EMBODIMENT

Figure 4:
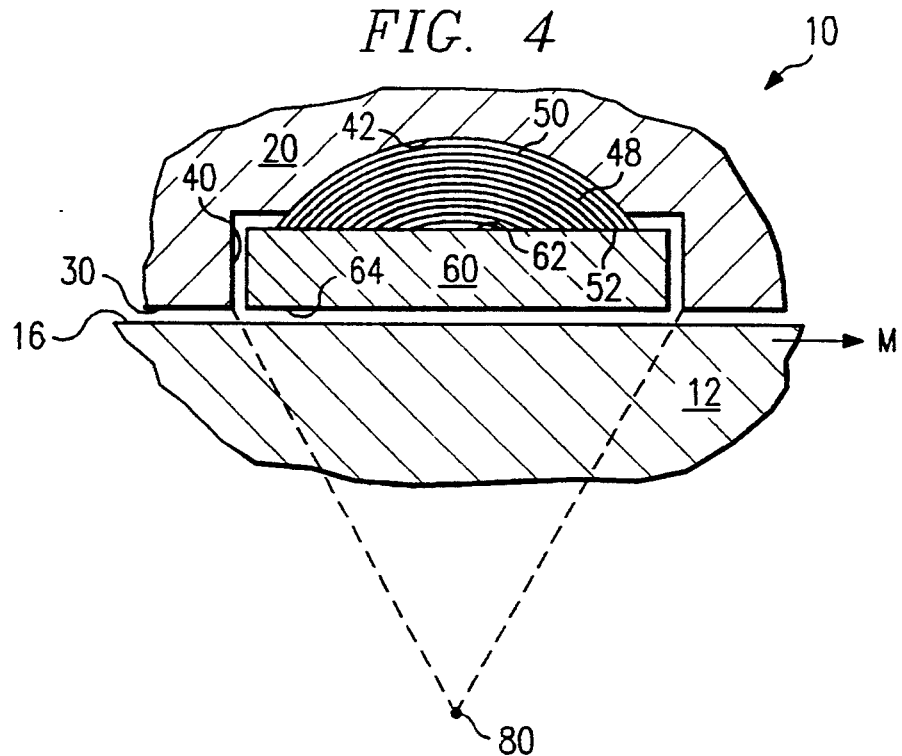
FIG. 4 is a partial cross-section of the assembly of the present invention taken along line 4—4 of FIG. 1 and a partial cross-section of an opposing member.

With reference to the accompanying FIGS. 1–5, wherein like reference numerals designate like or corresponding parts through the several views, the preferred embodiment of the present invention is explained hereinafter.

FIG. 1 shows a partial front view of the hydrodynamic face seal with hydrodynamic thrust pad assembly 10 and FIG. 2 shows a cross-section of assembly 10 taken along line 2—2 of FIG. 1. FIG. 2 additionally shows opposing member 12. Assembly 10 is adapted for sealing with and counteracting a closing load against opposing member 12 when opposing member 12 is rotating relative to assembly 10 with a fluid film being provided between the thrust pads 60 of assembly 10 and opposing member 12. Opposing member 12 has sealing surface 14 and bearing surface 16.

Assembly 10 comprises ring structure 20 having a center axis designated by reference numeral 22. Ring structure 20 has inner periphery 24 facing generally radially inwardly and outer periphery 26 facing generally radially outwardly. Front side 30 of ring structure 20 faces an axial direction and has radial extent from inner periphery 24 to outer periphery 26. Front side 30 has, as a part of its radial extent, seal face 32 in a plane perpendicular to center axis 22 of ring structure 20. Seal face 32 is continuous about ring structure 20 and is suitable for sealing against sealing surface 14 of opposing member 12 when opposing member 12 rotates relative to ring structure 20 and seal face 32 and sealing surface 14 are axially loaded against each other. Any face seal design can be used. For example, either ring structure 20 or opposing member 12 can be stationary while the other is rotated. During rotation, the fluid provided to the interface between seal face 32 and sealing surface 14 forms a lubricating fluid film between the two surfaces which reduces friction and wear.

With reference to FIGS. 1 and 2, front side 30 also has, as part of its radial extent, a plurality of cut-outs 40 arranged in a circular pattern concentric with seal face 32. Each cut-out 40 has concave surface 42 extending into front side 30. Assembly 10 comprises a plurality of elastomeric laminates 48. Each laminate 48 has convex side 50 which is disposed against concave surface 42 and curved substantially the same as concave surface 42. If desired, convex side 50 can be bonded to concave surface 42. Laminates 48 have pad side 52 opposite convex side 50. Pad sides 52 are preferably flat. Bonded to each pad side 52 is thrust pad 60. Each thrust pad has back 62 bonded to pad side 52 of laminate 48 and front 64 facing bearing surface 16 of opposing member 12. Suitable thrust pads 60 and laminates 48 are manufactured by the Torrington Company.

In the preferred embodiment a plurality of thrust pads 60 are spaced equally and concentrically about seal face 32. Preferably pads 60 are radially outside of seal face 32. The axial extent of seal face 32 and front 64 of pads 60 does not have to be the same. Due to fluid film formation, preferably the radial extent A of seal face 32 is between about 0.3 to 0.5 times the radial extent B of pads 60.

FIG. 3 illustrates the pressure distribution of closing load L and opening load 0. The closing load can be caused by spring bias, hydraulic pressure, or a combination. Preferably the entire closing load is supported by the thrust pads 60 to reduce interfacial pressures at the sealing face and thus reduce friction and wear. Opening load is a function of the resiliency of the mount of thrust pads 60.

Figure 5:
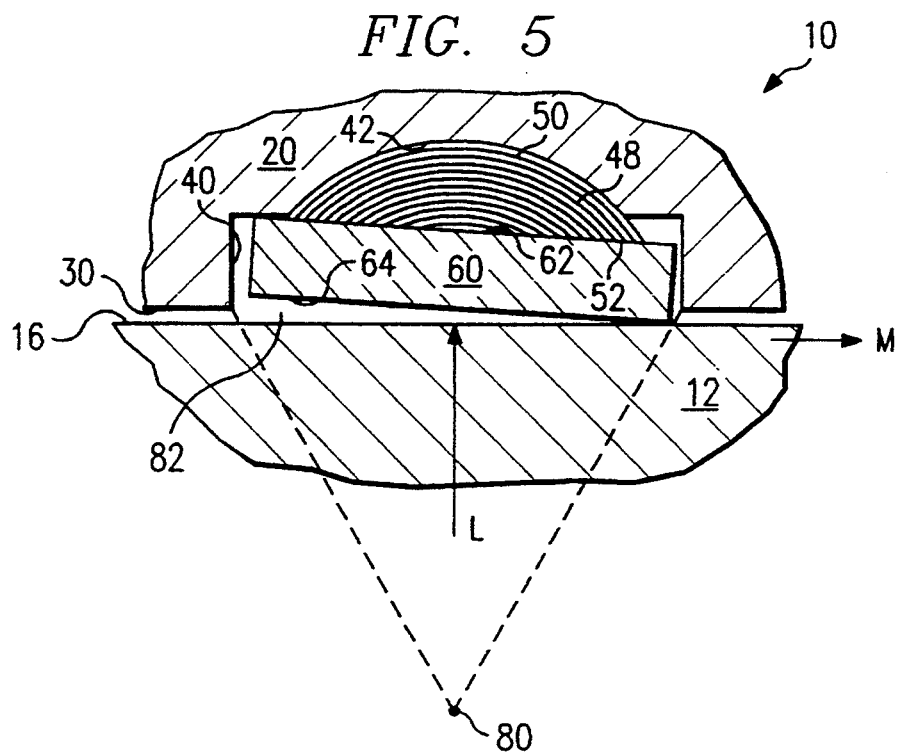
FIG. 5 is the same cross-section of FIG. 4 but illustrating the tilting of the thrust pad when an opposing member is in motion relative to the thrust pad.

With reference to FIGS. 4 and 5, when a closing load L is transmitted through bearing surface 16 of opposing member 12 against fronts 64 of pads 60 while opposing member 12 rotates relative to ring structure 20, friction and pressure faces of the fluid film formed between pads 60 and bearing surface 14 cause each pad 60 to swing about a pivot point designated by reference numeral 80, which is in front of front 64 of pad 60, such that a wedge-shaped gap 82 is formed which converges in the direction of relative motion M of opposing member 12.

U.S. Pat. No. 3,930,691, while different in structure, explains how a particular curved laminate operates to allow thrust pads to swing so that a converging wedge is formed. The teachings of U.S. Pat. No. 3,930,691 are incorporated herein by reference.

The face seal of the present invention uses hydrodynamic thrust pads and laminates in combination to counteract closing loads against the seal. Use of the thrust pads as disclosed in a face seal application provides a number of distinct advantages. For example, bi-directional operation is achieved without penalty of negative pressure generation such as occurs in a double-tapered land seal in a diverging fixed film. Excellent starting characteristics are achieved because the converging wedge allows rapid film formation even under high-loaded conditions. The elastomeric laminates provide compliance which allows the pads to equalize load and displacement. There is also a radial alignment capability in the pads which obviates the coning effects of solid ring members. Additionally, the separate pads will minimize thermal distortions in the circumferential and radial directions as compared to solid ring seals. Zero speed shut-off is another advantage.

It is preferred that pads 60 be radially outside of seal face 32 so that a high pressure can be maintained about pads 60 while centrifugal forces will oppose any leakage that might flow radially inward through the seal face/sealing surface interface.

Although the present invention has been described with respect to a preferred embodiment, various changes, substitutions and modifications of such embodiment may be suggested to one skilled in the art, and it is intended that the present invention encompass such changes, substitutions and modifications as fall within the scope of the appended claims.

I claim:

1. A hydrodynamic face seal with thrust pads assembly adapted for sealing with and counteracting a closing load against a relatively rotating opposing member with a fluid film between the assembly and the opposing member, the opposing member having a sealing surface and a bearing surface, the assembly comprising:
    (a) a ring structure having a center axis, an inner periphery facing generally radially inwardly, an outer periphery facing generally radially outwardly, and a front side facing in an axial direction, the from side having a radial extent from the inner periphery to the outer periphery, the front side having as part of its radial extent a seal face in a plane perpendicular to the center axis of the ring structure, the seal face being continuous about the ring structure and suitable for sealing against the sealing surface of the opposing member when the opposing member rotates relative to the ring structure and the seal face and the sealing surface are axially loaded against each other, the front side also having as part of its radial extent a plurality of cut-outs arranged in a circular pattern concentric with the seal face and radially outside of the seal face, each of the plurality of cut-outs defining a concave surface;
    (b) a plurality of elastomeric laminates, each laminate having a convex side and a pad side opposite thereto, the convex side of each laminate curved substantially the same as the concave surfaces of the plurality of cut-outs and disposed against the concave surface of one of the plurality of cut-outs;
    (c) a plurality of thrust pads, each thrust pad having a back and a front opposite thereto, the back of each thrust pad bonded to the pad side of one of the plurality of laminates; and
    (d) wherein when a closing load is transmitted through the bearing surface of the opposing member against the plurality of thrust pads while the opposing member rotates relative to the ting, friction and pressure forces of the fluid film cause each pad to swing about a pivot point located towards the opposing member such that the fluid film converges in the direction of movement of the opposing member.

2. The assembly of claim 1 wherein the convex side of each laminate is bonded to the concave surface of one of the plurality of cut-outs.

3. The assembly of claim 1 wherein the pad side of the laminates is flat.

4. The assembly of claim 1 wherein the radial extent of the seal face is between about 0.3 to about 0.5 times the radial extent of the thrust pads.

* * * * *

UNITED STATES PATENT AND TRADEMARK OFFICE
CERTIFICATE OF CORRECTION

PATENT NO. : 5,399,024
DATED : March 21, 1995
INVENTOR(S) : Wilbur Shapiro

It is certified that error appears in the above-indentified patent and that said Letters Patent is hereby corrected as shown below:

Column 4, line 17, delete "from" and (1st occur.) and insert --front--.

Column 4, line 45, delete "ting" and insert --ring--.

Signed and Sealed this

Fifteenth Day of August, 1995

Attest:

BRUCE LEHMAN

Attesting Officer      Commissioner of Patents and Trademarks